United States Patent [19]
Kraus

[11] Patent Number: 4,830,578
[45] Date of Patent: May 16, 1989

[54] HYDRAULIC CONTROL ARRANGEMENT FOR AN INFINITELY VARIABLE TRANSMISSION DRIVE

[75] Inventor: Charles E. Kraus, Austin, Tex.
[73] Assignee: Excelermatic Inc., Austin, Tex.
[21] Appl. No.: 112,393
[22] Filed: Oct. 26, 1987
[51] Int. Cl.⁴ .................. F04B 49/00; F04B 49/08
[52] U.S. Cl. ............................... 417/223; 74/190.5
[58] Field of Search ............. 417/15, 223; 74/190.5, 74/200

[56] References Cited

U.S. PATENT DOCUMENTS

| | | | |
|---|---|---|---|
| 2,599,680 | 6/1952 | Weeks | 417/223 |
| 2,905,026 | 9/1959 | Oeheli | 74/190.5 |
| 4,056,989 | 11/1977 | Shaffer | 74/200 |
| 4,170,438 | 10/1979 | Kondo | 417/223 |
| 4,173,152 | 11/1979 | Kondo | 417/223 |
| 4,444,068 | 4/1984 | Kraus | 74/200 |
| 4,526,051 | 7/1985 | Kraus | 74/200 |

*Primary Examiner*—William L. Freeh

[57] ABSTRACT

A hydraulic speed control arrangement for an infinitely variable transmission which is coupled to an engine and adapted to drive auxiliary equipment including a hydraulic fluid displacement pump includes a spool valve provided with an inlet cavity at one end of the valve spool in the valve body and connected to the hydraulic fluid displacement pump and has a spring disposed at the opposite end and biasing the valve spool against the pressure of the fluid in the inlet cavity, whereby the valve spool is adapted to control the flow of pressurized fluid from the inlet cavity to the transmission ratio control mechanism of the infinitely variable transmission in such a manner that the output shaft speed of the transmission is maintained essentially at a predetermined value. The valve spool had a face portion at its one end provided with a flow orifice structure at its circumference and, further there is a pressurized fluid cavity disposed adjacent the valve spool face portion so as to control the fluid flow through the orifice structure depending on the position of the face portion which for some applications is in communication with the area of the valve at the other end of the valve spool and the fluid cavity is connected to a pressurized hydraulic fluid user to supply thereto the pressurized fluid needed thereby.

11 Claims, 1 Drawing Sheet

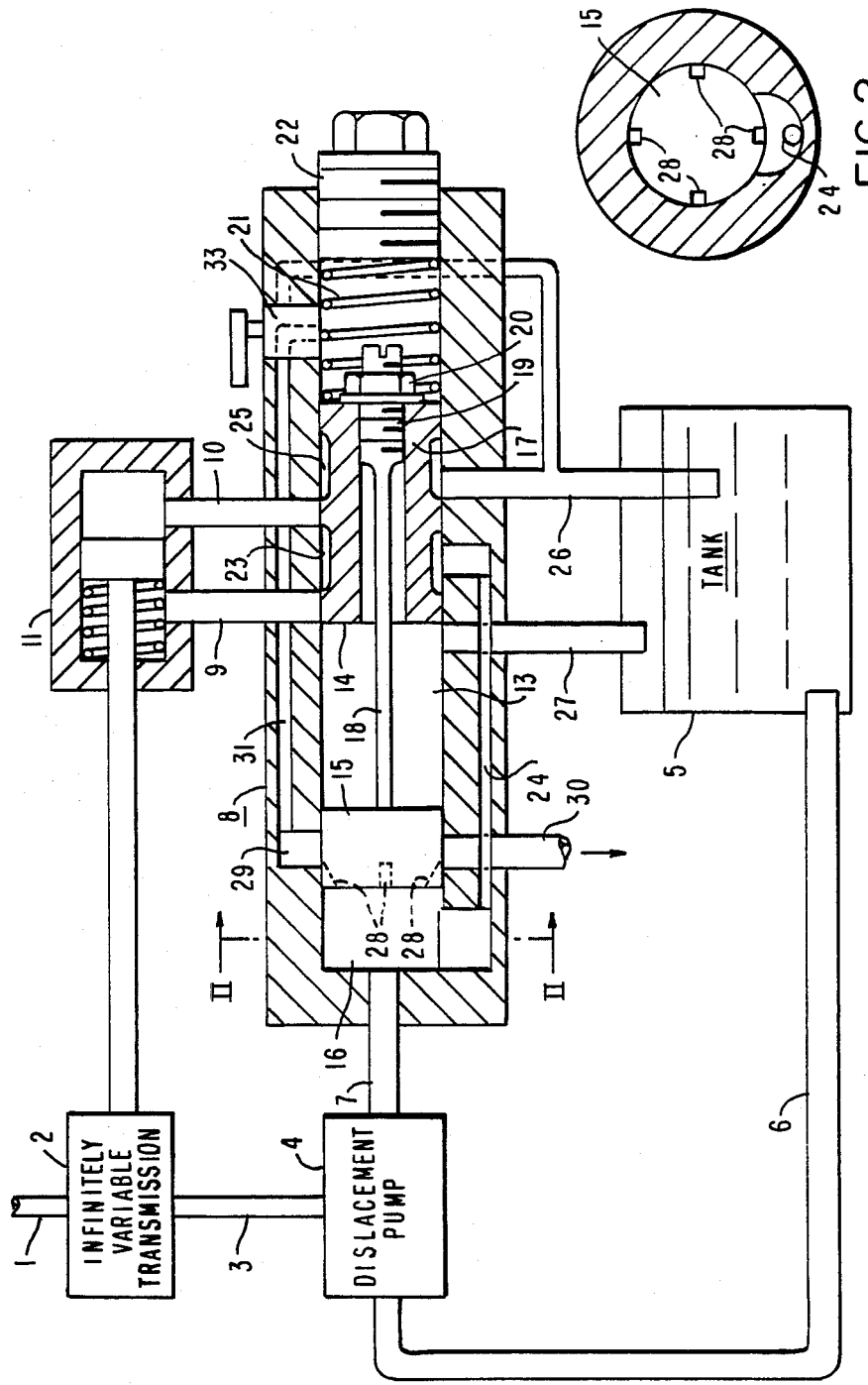

HYDRAULIC CONTROL ARRANGEMENT FOR AN INFINITELY VARIABLE TRANSMISSION DRIVE

BACKGROUND OF THE INVENTION

The present invention relates to a hydraulic control arrangement for automatically controlling the output shaft speed of an infinitely variable transmission, particularly for the operation of different auxiliary equipment.

In many cases it would be desirable to operate certain equipment at a constant speed while the speed of the power supply varies. Car engine accessories, in many cases, are needed to a greater degree when the car is moving slowly or at a standstill, that is, when the engine is idling, than at high vehicle and engine speeds. Power steering, for example, is hardly needed when a car is moving at high speeds on a straight highway but is utilized to its fullest during parking maneuvers. Demands on the air conditioning are much greater when a car is at a standstill or moving slowly, and the radiator fan is needed only during slow-speed operation of the vehicle since at travel speeds ram air alone is sufficient for radiator cooling. Also the alternator must be able to supply all the electric power required for the operation of the vehicle at engine idling speed.

All the accessories accordingly need to be oversized so as to be adequate at engine idle speeds. They are therefore generally relatively heavy and wasteful at higher speeds. They could be designed to substantially smaller sizes if they could only be operated at a predetermined design speed independently of the speed of their power supply. It may also be mentioned that a smaller engine would be sufficient to drive a particular vehicle. Smaller size equipment would not only be lighter and less expensive but it would also save a considerable amount of fuel.

Infinitely variable speed transmissions which could be used in connection with variable speed power supplies to provide a constant output speed for driving accessories are available but transmission controls are complicated, relatively unreliable and expensive.

Also a hydraulic speed control arrangement for such a transmission is known from Applicant's U.S. Pat. No. 4,501,172, which, in addition to controlling the speed of the transmission, provides for a supply of pressurized fluid for outside use, for example, for lubrication of bearings. However the amount of pressurized fluid needed for the operation of a particular accessory may vary substantially and flow variations would adversely affect the control since a constant size orifice determines the fluid flow and, as a result, the transmission ratio adjustment.

It would therefore be desirable to provide an inexpensive, simple and reliable speed control arrangement for an infinitely variable transmission with the aid of a hydraulic pump and control valve which would permit operation of engine accessories at a constant predetermined speed while deriving power from an engine operated at varying speeds and at the same time providing the appropriate amount of hydraulic fluid for driving some of the accessory equipment.

SUMMARY OF THE INVENTION

In a hydraulic speed control arrangement for an infinitely variable transmission which is coupled to an engine for the operation of auxiliary equipment including a hydraulic fluid displacement pump there is provided a spool valve having an inlet cavity in the valve body at one end of the valve spool in communication with the hydraulic fluid displacement pump for receiving pressurized fluid therefrom and a spring disposed at the opposite end for biasing the valve spool against the pressure of the fluid in the inlet cavity with communication passages in the valve body and control cavities in the valve spool arranged to cooperate so that pressurized fluid flow to and from the transmission ratio control structure is controlled in such a manner that the output shaft speed of the transmission is maintained essentially at a predetermined level, and the valve spool has a face portion at its end provided at its circumference with flow orifices and the valve body has a pressurized fluid cavity adjacent the face portion of the valve spool such that the fluid flow through the orifices to the pressurized fluid cavity is dependent on the axial position of the face portion of the spool and, further a balancing passage may extend between the pressurized fluid cavity and the valve area at the other end of the valve spool so as to maintain a supply of lubricant of a desired pressure for hydraulically operated auxiliary equipment.

With this arrangement the infinitely variable transmission is controlled to provide generally the desired output shaft speed as needed for the operation of the auxiliary mechanical equipment coupled thereto, such as an a.c. compressor, but it is also controlled to provide the necessary pressurized fluid for the operation of hydraulically operated equipment such as the power steering of a vehicle.

If, as in the preferred embodiment, the spring force is adjustable and the valve spool's face portion is adjustable relative to the main spool body, it is possible to adjust the pressure of the hydraulic fluid supplied for the operation of the hydraulically operated auxiliary equipment and also the general output shaft speed of the infinitely variable transmission as desired for the given purposes.

SHORT DESCRIPTION OF THE DRAWINGS

FIG. 1 shows in cross section a control valve and schematically the control arrangement in which the valve is disposed for controlling the output shaft speed of an infinitely variable transmission; and FIG. 2 is a cross-sectional view along lines II—II of FIG. 1.

DESCRIPTION OF A PREFERRED EMBODIMENT

In the schematic arrangement as shown in FIG. 1 power is supplied to the input shaft 1 of an infinitely variable transmission 2 from a power source of varying speed such as an automobile engine. The transmission 2 may be a traction roller transmission of the type as described in the present inventor's U.S. Pat. No. 4,086,820 wherein the transmission ratio control is achieved by hydraulic control means, that is, the ratio is changed to provide slower output shaft speed by supplying control fluid to the hydraulic transmission ratio control of the transmission or in the present inventor's co-pending application Ser. No. 112,392 of Oct. 26, 1987.

The output shaft 3 of the transmission 2 is connected to a load (not shown) which requires constant operating speed and has operatively associated therewith a displacement pump 4, for example, a power steering pump, which provides for a fluid flow from a fluid tank 5 through a suction line 6 and a discharge line 7 to a transmission control valve 8. The control valve 8 is connected to the transmission 2 by way of control fluid lines 9 and 10 through which pressurized fluid is supplied to, or discharged from, the ratio control cylinders 11 of the transmission for adjusting the transmission ratio. The fluid from the control cylinders 11 is returned to the tank 5 through the control valve 8.

The control valve 8 consists of a valve body 12 having a cylinder cavity 13 with a valve spool 14 movably disposed therein. The valve spool 14 has a face portion 15 disposed adjacent the cylinder cavity inlet end 16 to which the pressurized fluid is supplied from the pump 4 through the discharge line 7 and a spool valve portion 17 to which the face portion 15 is connected by a connecting rod 18. The connecting rod 18 has a threaded end 19 threaded into the spool valve portion 17 and locked in position by a nut 20 so that the distance of the face portion 15 from the spool valve portion is adjustable for drive speed adjustments. A spring 21 is disposed behind the spool valve portion 17 so as to bias the valve spool 14 toward the valve inlet end 16, the spring 21 abutting an adjustment screw 22 threaded into the cylinder cavity 13 at its end opposite the fluid inlet end 16. The valve spool 14 has a speed control fluid supply groove 23 which is in communication with the cylinder inlet end 16 by way of fluid passage 24 so that pressurized fluid can be supplied to the speed control cylinder 11 either through the control fluid line 9 or line 10 depending on the position of the valve spool 14. If the valve spool 14 moves slightly toward the inlet end 16 of the valve, the groove 23 provides for communication with one side of the control cyliner 11 so as to cause speed up of the transmission output shaft and an increase in lubricant flow generated by the pump 4. This again causes movement of the valve spool in opposite direction, resulting correspondingly in a decrease of the transmission output shaft speed. While fluid is supplied to the control cylinder through one of the control fluid lines 9 and 10, for example, line 9, the other, that is, in this case line 10, is placed in communication with a control fluid discharge groove 25 through which the control fluid discharged from the control cylinder 11 is permitted to drain into the tank 5 through drain line 26. If on the other hand the valve spool 14 moves away from the valve inlet end 16 by an over-supply of pressurized fluid, the fluid line 10 is placed in communication with the speed control fluid supply groove 23 so that the transmission ratio of the infinitely variable transmission is changed for reduced output speed. In this case, line 9 is placed into communication with the space of the cylinder cavity 13 between the valve spool 14 and the face portion 15 and the fluid from line 9 is permitted to drain into the tank 5 through drain line 27.

The face portion 15 of the valve spool 14 has flow control orifices 28 formed therein at circumferentially, preferably equally, spaced locations, the flow orifices 28 being somewhat inclined so as to provide for an increased flow cross-section when the spool valve moves away from the inlet end 16 as a result of increased fluid demand, for example.

A pressurized fluid cavity 29 surrounds the cylinder cavity 13 adjacent the face portion 15 of the valve spool 14 through which the pressurized fluid is supplied to pressurized fluid users such as an automobile's power steering unit through pressurized fluid line 30. A balance fluid passage 31 extends through the valve body and provides communication between the pressurized fluid cavity 29 and the cylinder end 32 opposite inlet end 16 providing therein a pressure corresponding to the pressure in the pressurized fluid line 30 so that the pressure differential that is established between the fluid in the inlet end 16 and that in the pressurized fluid line 30 corresponds to the force applied to the spool 14 by the spring 21, the spring force being adjustable by the adjustment screw 22.

Preferably, also a valve 33 is arranged in the balance passage for closing the passage and at the same time providing communication between the spring receiving cylinder cavity end opposite the inlet end 16 and the fluid tank 5 so that the pressure established in the pressurized fluid line corresponds only to the force set by the spring 21.

For a certain design flow at a design fluid differential pressure determined by the spring setting for a given design pump speed, the face portion 15 of the spool 14 will be at a predetermined axial position relative to the pressurized fluid cavity 29, that is, the flow orifices 28 should be of a particular size, their size or flow cross-section being determined by the axial position of the face portion 15. With the face portion 15 of the spool being adjustable relative to the spool valve portion 17, the amount of fluid at which speed control actions are initiated by the spool valve, that is, the general output shaft speed of the infinitely variable transmission, can be easily and accurately adjusted to a desired level.

It is noted however that if, for example, the pressurized fluid demand increases by greater use of pressurized fluid for operating, for example, power equipment for a period of time, the spool valve will immediately initiate a change in the transmission ratio so as to increase the pump speed to meet the increased demand for pressurized fluid while the prime mover's, that is, the engine's speed remains unchanged.

Also, if the speed of the engine to which the transmission is coupled is changed for some reason while the demand for pressurized fluid remains unchanged, the infinitely variable transmission is controlled so as to keep its output shaft speed essentially constant.

The valve according to the invention can operate the auxiliary equipment in two different ways depending on whether the balance fluid passage 31 is present or operative, or not. With the balance passage 31 present or open, the force effective to move the valve spool 14 is determined by the input pressure times the spool area minus output pressure times the spool area plus the spring force. When the flow changes, the spool orifice area must change to maintain force equilibrium on the spool: The flow remains essentially constant independent of the system pressure in the pressurized fluid line 30 and the pressurized fluid cavity 29.

On the other hand if the balance fluid passage 31 is closed, any change in system pressure will move the valve spool 14 and change the transmission ratio so as to maintain the system pressure—regardless of transmission output speed and fluid flow—in accordance with the pressure set by the spring 21.

What is claimed is:

1. A hydraulic speed control arrangement for an infinitely variable transmission coupled to a prime mover and adapted to drive auxiliary equipment including a hydraulic fluid displacement pump connected to the infinitely variable transmission output shaft, said control arrangement including a valve structure having a valve body with a cylindrical cavity and a valve spool movably disposed in said cylinder with a hydraulic fluid inlet cavity disposed at one end of said cylindrical cavity at one side of said valve spool and a spring disposed at the other end of said cylindrical cavity and engaging said valve spool at the opposite side thereof, said inlet cavity having a pump discharge line connected thereto for receiving pressurized fluid from said hydraulic fluid displacement pump which pressurized fluid is adapted to move said spool within said cylindrical cavity against the force of said spring, said valve spool having a spool valve portion with a speed control cavity in communication with the inlet end of said cylindrical cavity so as to receive pressurized fluid therefrom and said valve body having control fluid lines connected to said infinitely variable transmission for controlling the transmission ratio thereof with said speed control cavity being arranged so as to be placed in communication with one of said control fluid lines for reduced transmission output shaft speed when said valve spool is moved by the pressurized fluid in the inlet cavity against the force of said spring and with the other of said control fluid lines for increased transmission output shaft speed when said valve spool is moved by said spring against the force of said pressurized fluid, said valve spool having a face portion provided at its circumference with a flow orifice structure and said valve body having a pressurized fluid cavity adjacent said face portion and cooperating therewith so as to receive the fluid flow through said orifice structure, said pressurized fluid cavity having a discharge opening for connection to a pressurized fluid line leading to a pressurized fluid user.

2. An arrangement according to claim 1, wherein a balance fluid passage extends through said valve body between said pressurized fluid cavity and said other end of the cylindrical cavity to provide for an essentially constant pressure differential between said inlet chamber and said pressurized fluid cavity as determined by the force of the spring at said other end.

3. An arrangement according to claim 2, wherein an adjustment screw is provided at the other end of said cylinder cavity for adjusting the spring force applied to said valve spool thereby to control the setting of said pressure differential.

4. An arrangement according to claim 2, wherein the face portion of said spool valve is mounted to said spool valve portion by means of a connecting rod threaded into the spool valve portion so as to permit adjustment of its position relative to the spool valve portion thereby to permit adjustment of the general transmission output shaft speed level.

5. An arrangement according to claim 1, wherein said flow orifice structure consists of inclined passages formed at the circumference of said face portion so as to increase the orifice flow cross-section upon displacement of said face portion by the pressurized fluid in the inlet cavity.

6. An arrangement according to claim 2, wherein a two-way valve is disposed in said balance passage adapted to place the spring receiving cavity at said other end selectively in communication with said pressurized fluid cavity or with a drain.

7. A control valve for controlling operation of an infinitely variable transmission adapted to drive auxiliary equipment including a hydraulic fluid displacement pump, including a valve body with a cylindrical cavity and a valve spool movably disposed therein, said cylindrical cavity having an inlet cavity formed at one end thereof and a spring disposed at the other end and engaged by a spring force adjustment screw threaded into the other end of said cavity for adjustment of the force applied by said spring to said valve spool, said valve spool having a spool valve portion with a speed control cavity disposed in communication with said inlet cavity and said valve body having control fluid openings arranged at opposite ends of said speed control cavity and adapted to be connected to the infinitely variable transmission for controlling its transmission ratio, said valve spool further having a face portion provided at its circumference with a flow orifice structure and said valve body having a pressurized fluid cavity adjacent said face portion and cooperating therewith so as to receive the fluid flow through said orifice structure, said inlet cavity having an inlet opening for connection to said displacement pump and said pressurized fluid cavity having a discharge opening for connection to a pressurized fluid line leading to a pressurized fluid user.

8. A control valve according to claim 7, wherein said flow orifice structure consists of inclined passages formed at the circumference of said face portion so as to increase the orifice flow cross-section upon displacement of said face portion by the pressurized fluid in the inlet cavity.

9. A control valve according to claim 7, wherein a balance fluid passage extends through said valve body between said pressurized fluid cavity and said other end of the cylindrical cavity to provide for an essentially constant pressure differential between said inlet chamber and said pressurized fluid cavity as determined by the force of the spring at said other end.

10. A control valve according to claim 9, wherein the face portion of said spool valve is mounted to said spool valve portion by means of a connecting rod threaded into the spool valve portion so as to permit adjustment of its position relative to the spool valve portion thereby to permit adjustment of the general transmission output shaft speed level.

11. A control valve according to claim 10, wherein a two-way valve is disposed in said balance passage adapted to place the spring receiving cavity at said other end selectively in communication with said pressurized fluid cavity or with a drain.

* * * * *